United States Patent
Shiraishi (10) Patent No.: US 9,437,862 B2
(45) Date of Patent: Sep. 6, 2016

(54) CONTAINER FOR ENERGY STORAGE DEVICE INCLUDING FULL PENETRATION WELDED SEALING MEMBER AND METHOD OF PRODUCING THE SAME

(71) Applicant: GS Yuasa International Ltd., Kyoto-shi (JP)

(72) Inventor: Yu Shiraishi, Kyoto (JP)

(73) Assignee: GS YUASA INTERNATIONAL LTD., Kyoto-Shi, Kyoto (JP)

(*) Notice: Subject to any disclaimer, the term of this patent is extended or adjusted under 35 U.S.C. 154(b) by 232 days.

(21) Appl. No.: 14/077,972

(22) Filed: Nov. 12, 2013

(65) Prior Publication Data

US 2014/0134476 A1    May 15, 2014

(30) Foreign Application Priority Data

Nov. 15, 2012  (JP) .................................. 2012-251680

(51) Int. Cl.
| | | |
|---|---|---|
| H01M 2/02 | (2006.01) | |
| H01M 2/04 | (2006.01) | |
| H01M 2/36 | (2006.01) | |
| H01M 10/04 | (2006.01) | |

(52) U.S. Cl.
CPC ............. H01M 2/365 (2013.01); *H01M 10/04* (2013.01)

(58) Field of Classification Search
CPC .............................. H01M 2/365; H01M 10/04
USPC .......................................................... 429/185
See application file for complete search history.

(56) References Cited

U.S. PATENT DOCUMENTS

| 6,190,798 B1 | 2/2001 | Okada et al. | |
|---|---|---|---|
| 2002/0004168 A1* | 1/2002 | Iwata ..................... | B23K 26/28 429/176 |
| 2006/0257733 A1* | 11/2006 | Kim ..................... | H01M 2/0486 429/185 |
| 2013/0115492 A1 | 5/2013 | Aota | |

FOREIGN PATENT DOCUMENTS

| JP | 11-273638 A | 10/1999 | |
|---|---|---|---|
| JP | 2000-123822 A | 4/2000 | |
| JP | 2009-199819 A | 9/2009 | |
| JP | 2012-018861 A | 1/2012 | |
| JP | WO 2012005020 A1 * | 1/2012 | ............ H01M 2/365 |

OTHER PUBLICATIONS

Morisane, Yuichiro, Machine translation of JP 2009-199819 A, Sep. 2009.*
Kato et al., Machine translation of JP 2000-123822 A, Apr. 2000.*

* cited by examiner

*Primary Examiner* — Sean P Cullen
(74) *Attorney, Agent, or Firm* — McGinn IP Law Group, PLLC (57) ABSTRACT

An energy storage device having a container containing an electrolyte includes: a through hole formed in the container, for injecting the electrolyte; a sealing member that covers the through hole; and a full penetration weld portion formed by full penetration welding the sealing member to the container.

19 Claims, 7 Drawing Sheets

CONTAINER FOR ENERGY STORAGE DEVICE INCLUDING FULL PENETRATION WELDED SEALING MEMBER AND METHOD OF PRODUCING THE SAME

CROSS-REFERENCE TO RELATED APPLICATION

The present application is based on and claims priority of Japanese Patent Application No. 2012-251680 filed on Nov. 15, 2012. The entire disclosure of the above-identified application, including the specification, drawings, and claims is incorporated herein by reference in its entirety.

FIELD

The present invention relates to an energy storage device including a container containing an electrolyte and to a method of producing the same.

BACKGROUND

Transitioning from the use of gasoline vehicles to electric vehicles is important in the effort to solve the global environmental problem. Energy storage devices such as non-aqueous electrolyte secondary batteries are one option for powering such electric vehicles.

In conventional energy storage devices, the container of the energy storage device includes a through hole. During production, an electrolyte is injected into the container through this through hole and contained in the container by sealing the through hole with a sealing member (for example, see Patent Literature (PTL) 1: Japanese Unexamined Patent Application Publication No. 2009-199819). In this energy storage device, the sealing member is fixed to the container while it plugs the through hole by welding the outer edge of the sealing member to the container.

SUMMARY

The present invention aims to provide an energy storage device capable of reducing the occurrence of defective welds when welding the sealing member to the container, and provide a method of producing of such an energy storage device.

In order to achieve this objective, an energy storage device according to an aspect of the present invention is an energy storage device having a container containing an electrolyte, the energy storage device including: a through hole formed in the container, for injecting the electrolyte; a sealing member that covers the through hole; and a full penetration weld portion formed by full penetration welding the sealing member to the container.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

The above-described conventional energy storage device is problematic in that there are times when a defective weld can occur when welding the sealing member to the container. In other words, there are times when welding the outer edge of the sealing member to the container while the electrolyte is clinging to the outer edge leads to a defective weld.

The present invention aims to provide an energy storage device capable of reducing the occurrence of defective welds when welding the sealing member to the container, and provide a method of producing such an energy storage device.

In order to achieve this objective, an energy storage device according to an aspect of the present invention is an energy storage device having a container containing an electrolyte, the energy storage device including: a through hole formed in the container, for injecting the electrolyte; a sealing member that covers the through hole; and a full penetration weld portion formed by full penetration welding the sealing member to the container.

With this, since the sealing member is fixed to the container by full penetration welding, it possible for the electrolyte clinging between the sealing member and the container to evaporate as the sealing member melts from the full penetration welding. This in turn makes it possible to reduce the occurrence of defective welds resulting from the sealing member being welded to the container while the electrolyte is clinging to the sealing member.

Moreover, the full penetration weld portion may be formed in a loop around the through hole.

With this, since the full penetration weld portion is formed in a loop around the through hole whereby the sealing member completely seals the through hole, it is possible to prevent the electrolyte from leaking and moisture, for example, from entering the container. Moreover, since the outer edge of the sealing member can be pressed against the container when full penetration welding the sealing member to the container, it is possible to minimize the gap between the sealing member and the container while welding more so than with the conventional method of welding the outer edge of the sealing member to the container.

Moreover, the sealing member may have a thin-walled portion, and the full penetration weld portion may be formed by full penetration welding the thin-walled portion to the container.

With this, since the full penetration weld portion is formed by full penetration welding the thin-walled portion of the sealing member to the container, it is possible to make other areas of the sealing member that are not welded by full penetration welding thick. This in turn makes it possible to keep the sealing member from deforming when handling the sealing member, and reduce the occurrence of defective welds resulting from the deformation of the sealing member.

Moreover, the sealing member may have a groove portion formed in a loop around the through hole, and the thin-walled portion may be formed at a location corresponding to the groove portion.

With this, since it is possible to form the thin-walled portion by forming a groove portion in the sealing member, forming the groove portion with a pressing process allows for a uniformly shaped thin-walled portion to be easily formed. Moreover, since it is acceptable if the thin-walled portion is merely formed at a location corresponding to the loop shaped groove portion in which full penetration welding is performed, it is possible to make the areas of the sealing member in which the groove portion is not formed thick. This in turn makes it possible to further keep the sealing member from deforming when handling the sealing member, and further reduce the occurrence of defective welds resulting from the deformation of the sealing member. Moreover, by forming the groove portion in the sealing member, it is possible to use the groove portion in the alignment of the sealing member with the welding machine.

Moreover, the sealing member may have a projecting portion which is inserted into the through hole, and the full penetration weld portion may be formed in a loop around the projecting portion.

This makes it possible to keep the electrolyte from leaking from the through hole when full penetration welding by fixing the sealing member to the container while the projecting portion is inserted in the through hole. This in turn makes it possible to further reduce the occurrence of defective welds resulting from the electrolyte clinging to the sealing member.

Moreover, the full penetration weld portion may be formed at a location closer to an outer edge of the sealing member than to a center of the sealing member.

With this, by offsetting the full penetration weld portion closer to the outer edge of the sealing member, an area of the sealing member is welded by full penetration welding where not much of the electrolyte is clinging rather than an area of the sealing member where much the electrolyte is clinging, thereby making it possible to further reduce the occurrence of defective welds.

Moreover, in order to achieve the above-described objective, a method of producing an energy storage device according to an aspect of the present invention is a method of producing an energy storage device having a container containing an electrolyte, and includes: positioning a sealing member on the container to cover a through hole formed in the container for injecting the electrolyte; and forming a full penetration weld portion by full penetration welding the sealing member to the container.

With this, the energy storage device is produced by positioning the sealing member on the container and full penetration welding the sealing member to the container. As such, the electrolyte clinging to the sealing member can evaporate as the sealing member melts from the full penetration welding, making it possible to reduce the occurrence of defective welds resulting from the electrolyte clinging to the sealing member.

Hereinafter, the energy storage device according to the embodiment of the present invention is described with reference to the Drawings. The exemplary embodiment described below shows a general or specific example. The shapes, materials, structural elements, the arrangement and connection of the structural elements, the steps, and the order of the steps etc. shown in the following exemplary embodiment are mere examples, and therefore do not limit the scope of the appended Claims and their equivalents. Moreover, among the structural elements in the following exemplary embodiment, structural elements not recited in any one of the independent claims defining the most generic part of the inventive concept are described as arbitrary structural elements.

Embodiment

First the structure of the energy storage device 10 will be described.

Figure 1:
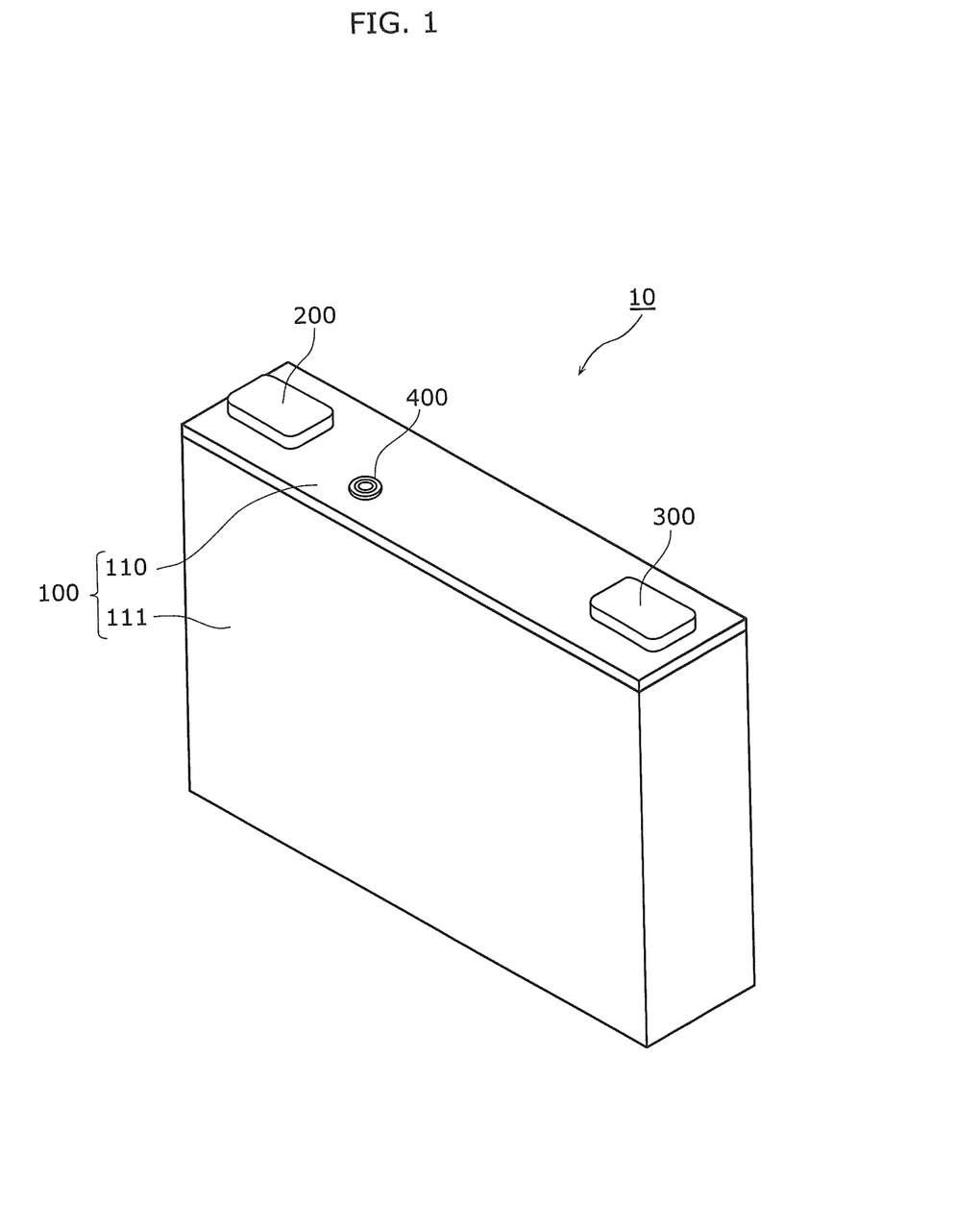
FIG. 1 is an external perspective view schematically showing the energy storage device according to the embodiment of the present invention.
Figure 2:
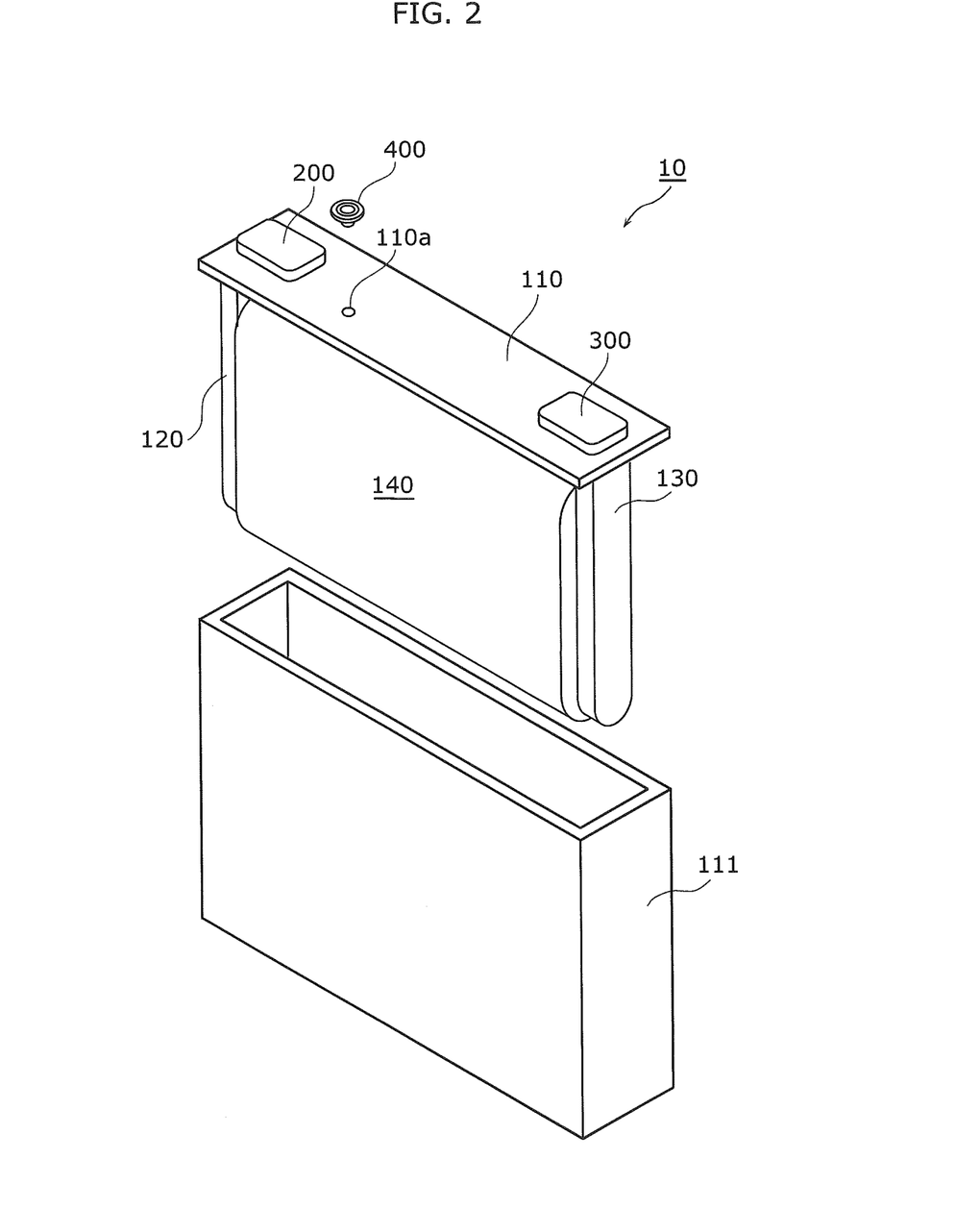
FIG. 2 is an external perspective view showing each structural element included in the energy storage device according to the embodiment of the present invention.

FIG. 1 is an external perspective view schematically showing the energy storage device 10 according to the embodiment of the present invention. FIG. 2 is an external perspective view showing each structural element included in the energy storage device 10 according to the embodiment of the present invention.

The energy storage device 10 is a secondary battery capable of charging and discharging electricity. More specifically, the energy storage device 10 is a non-aqueous electrolyte secondary battery such as a lithium ion secondary battery. It should be noted that the energy storage device 10 is not limited to a non-aqueous electrolyte secondary battery. The energy storage device 10 may be a secondary battery other than a non-aqueous electrolyte secondary battery, such as a capacitor.

As FIG. 1 shows, the energy storage device 10 includes a container 100, a positive electrode terminal 200, a negative electrode terminal 300, and a sealing member 400. Moreover, as FIG. 2 shows, a positive electrode current collector 120, a negative electrode current collector 130, and an electrode assembly 140 are stored inside the container 100. It is to be noted that even though it is not shown in the Drawings, the container 100 of the energy storage device 10 contains a liquid such as an electrolyte.

The container 100 includes a rectangular, tubular case 111 having a bottom, and a cover 110 which is a plate member that covers the opening of the case 111. Moreover, after insertion of the electrode assembly 140 and such, the inside of the container 100 is sealed by, for example, welding the cover 110 to the case 111. It should be noted that the material used for the cover 110 and the case 111 is not particularly limited to a certain material, but is preferably a weldable metal such as stainless steel.

Moreover, as FIG. 2 shows, a through hole 110a is formed in the cover 110 of the container 100. Here, the through hole 110a is a circular cylindrical through hole for injecting the electrolyte during production of the energy storage device 10. It should be noted that the shape of the through hole 110a is not limited to a circular cylindrical shape. The through hole 110a may be prismatic in shape.

Moreover, as FIG. 1 shows, the sealing member 400 is positioned on the cover 110 to cover the through hole 110a. In other words, during production of the energy storage device 10, the electrolyte is injected into the container 100 through the through hole 110a and is contained in the container 100 by covering the through hole 110a with the sealing member 400. A detailed description of the sealing member 400 will be given later.

It should be noted that so long as it does not inhibit the performance of the energy storage device 10, the electrolyte (non-aqueous electrolyte) enclosed in the container 100 is not particular limited to a certain type; a variety of electrolytes may be used.

The electrode assembly 140, a component that is capable of storing electricity, includes the positive electrode, the negative electrode, and a separator. The positive electrode is a long, belt-shaped positive electrode base material foil made of aluminum or an aluminum alloy with a positive electrode active material layer formed thereon. The negative electrode is a long, belt-shaped negative electrode base material foil made of copper or a copper alloy with a negative electrode active material layer formed thereon. The separator is a microporous sheet made from resin.

Here, for example, any appropriate, well-known material that is a positive electrode active material capable of adsorbing and desorbing lithium ions can be used for the positive electrode active material layer, and likewise, any appropriate, well-known material that is a negative electrode active material capable of adsorbing and desorbing lithium ions can be used for the negative electrode active material layer.

The electrode assembly 140 is formed by winding a layered body of the negative electrode, the positive electrode, and the separator interposed therebetween. It should be noted that in FIG. 2, the electrode assembly 140 is depicted as being oblong in shape, but the electrode assembly 140 may be circular or elliptical in shape. Moreover, the form of the electrode assembly 140 is not limited to a wound body. For example, the electrode assembly 140 may be formed of stacked flat electrode plates.

The positive electrode terminal 200 is an electrode terminal that is electrically connected to the positive electrode in the electrode assembly 140, and the negative electrode terminal 300 is an electrode terminal that is electrically connected to the negative electrode in the electrode assembly 140. In other words, the positive electrode terminal 200 and the negative electrode terminal 300 are metallic electrode terminals for leading electricity stored in the electrode assembly 140 out of the energy storage device 10 and guiding electricity into the energy storage device 10 to be stored in the electrode assembly 140. Moreover, the positive electrode terminal 200 and the negative electrode terminal 300 are attached to the cover 110 located above the electrode assembly 140.

The positive electrode current collector 120 is a rigid component having conductive properties that is electrically connected to the positive electrode terminal 200 and the positive electrode in the electrode assembly 140, and positioned between the positive electrode in the electrode assembly 140 and a side wall of the case 111 of the container 100. It should be noted that the positive electrode current collector 120 and the positive electrode base material foil in the electrode assembly 140 alike are made of aluminum or an aluminum alloy.

The negative electrode current collector 130 is a rigid component having conductive properties that is electrically connected to the negative electrode terminal 300 and the negative electrode in the electrode assembly 140, and positioned between the negative electrode in the electrode assembly 140 and a side wall of the case 111 of the container 100. It is to be noted that the negative electrode current collector 130 and the negative electrode base material foil in the electrode assembly 140 alike are made of copper or a copper alloy.

Next, the structure of the sealing member 400 and the configuration of the sealing member 400 when positioned on the cover 110 will be discussed in detail.

Figure 3:
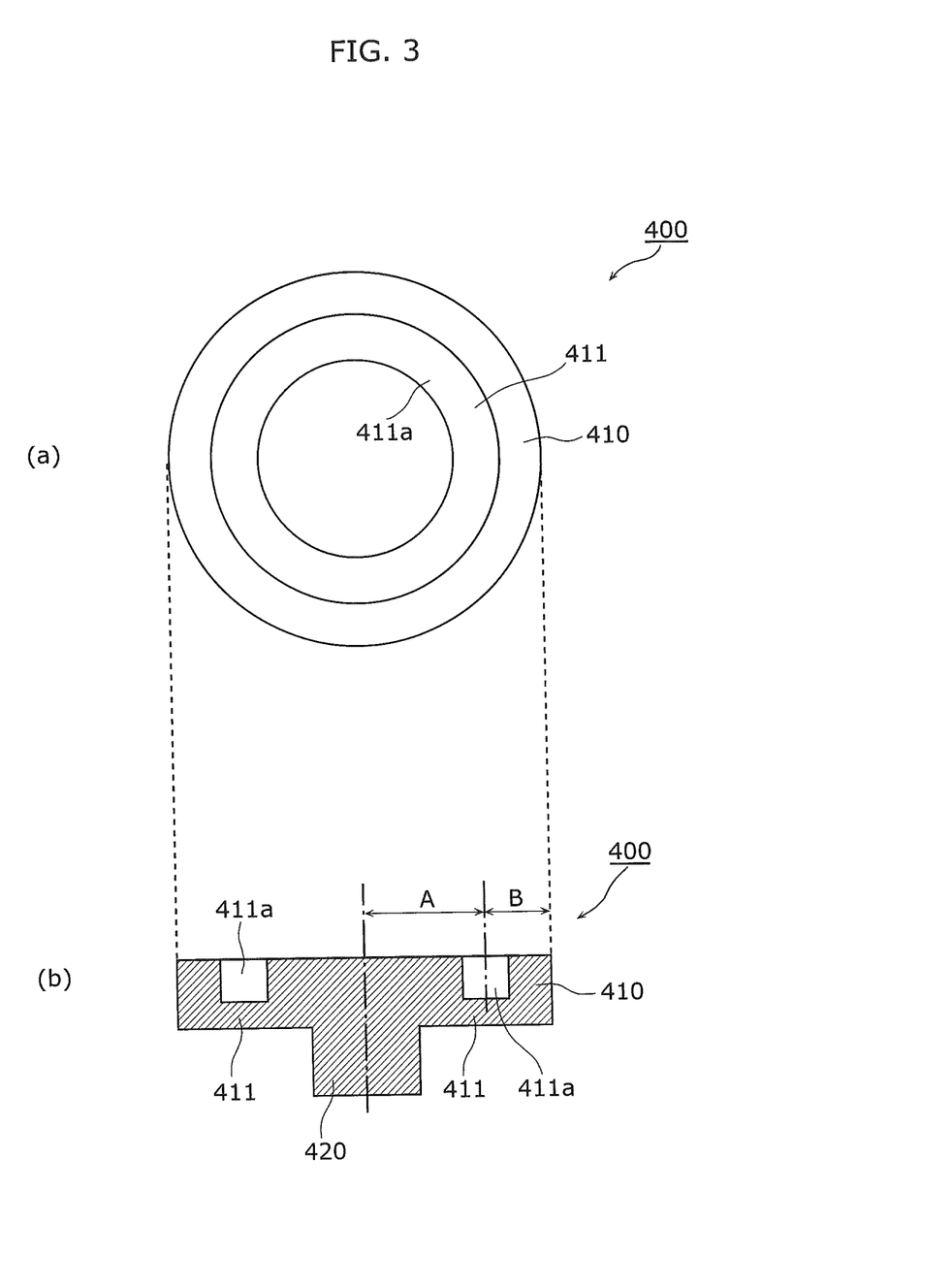
FIG. 3 illustrates the structure of the sealing member according to the embodiment of the present invention.
Figure 4:
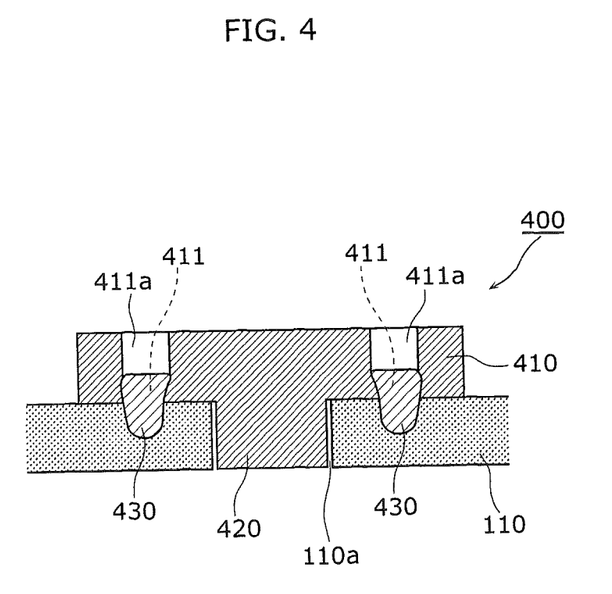
FIG. 4 illustrates the configuration of the sealing member according to the embodiment of the present invention when positioned on the cover of the container.

FIG. 3 illustrates the structure of the sealing member 400 according to the embodiment of the present invention. More specifically, (a) in FIG. 3 is a top view of the sealing member 400 before it is positioned on the cover 110, and (b) in FIG. 3 is a cross sectional view of the sealing member 400 before it is positioned on the cover 110. FIG. 4 illustrates the configuration of the sealing member 400 according to the embodiment of the present invention when positioned on the cover 110.

As FIG. 3 and FIG. 4 show, the sealing member 400 includes a fixing portion 410 which is fixed to the cover 110 and a projecting portion 420 which protrudes from the fixing portion 410.

The fixing portion 410 is a disk shaped member which is fixed to the cover 110 to cover the through hole 110a. The fixing portion 410 is made of a metal that is weldable to the cover 110, such as stainless steel. It should be noted that the shape of the fixing portion 410 may be a different shape, such as a flat, rectangular shape, so long as the shape allow for the through hole 110a to be covered. Here, a groove portion 411a is formed in the fixing portion 410. The fixing portion 410 includes a thin-walled portion 411 formed at a location corresponding to the groove portion 411a. The fixing portion 410 includes first and second thick-walled portions surrounding the thin-walled portion 411.

The groove portion 411a is a depression formed in a loop around the projecting portion 420 and, when the sealing member 400 is positioned on the cover 110, surrounds the through hole 110a. It should be noted that in the embodiment, the groove portion 411a is formed in a circular loop, but shape of the groove portion 411a is not limited thereto. For example, the groove portion 411a may be formed in a loop having an elliptical or rectangular shape. Moreover, the groove portion 411a is preferably formed to have a squared cross section, but the cross section of the groove portion 411a is not limited to a square shape. For example, the groove portion 411a may be formed to have a cross sectional shape other than a square such as a polygonal shape or an arc shape.

Moreover, the groove portion 411a is preferably formed at a location closer to the outer edge of the sealing member 400 than to the center of the sealing member 400. In other words, as (b) in FIG. 3 shows, the groove portion 411a is formed such that the distance A between the center of the sealing member 400 and the center of the groove of the groove portion 411a is greater than the distance B between the center of the groove of the groove portion 411a and the outer edge of the sealing member 400.

The thin-walled portion 411 is formed as a result of the formation of the groove portion 411a in the fixing portion 410, and is a portion that is thin in thickness. In other words, similar to the groove portion 411a, the thin-walled portion 411 is formed in a loop around the projecting portion 420 and, when the sealing member 400 is positioned on the cover 110, surrounds the through hole 110a. Moreover, similar to the groove portion 411a, the thin-walled portion 411 is formed at a location closer to the outer edge of the sealing member 400 than to the center of the sealing member 400. With this, the location and shape of the thin-walled portion 411 corresponds to the location and shape of the groove portion 411a.

The projecting portion 420 is a projecting member which inserts into the through hole 110a. More specifically, the projecting portion 420 is a circular cylindrical member projecting out from the center of the fixing portion 410. Here, the projecting portion 420 and the fixing portion 410 are formed as a single member, but they may be formed as separate members. Moreover, the shape of the projecting portion 420 is not limited to a circular cylindrical shape. The projecting portion 420 is preferably formed to have a shape that corresponds with the shape of the through hole 110a.

Moreover, as FIG. 4 shows, when the sealing member 400 is positioned on the cover 110, the sealing member 400 is welded to the container 100 by full penetration welding with, for example, a laser to form a full penetration weld portion 430. More specifically, a portion of the thin-walled portion 411 and the cover 110 is melted by welding from the side of the sealing member 400 on which the groove portion 411a of the fixing portion 410 is formed, whereby the fixing portion 410 and the cover 110 are bonded together. In other words, the full penetration weld portion 430 is formed by full penetration welding the thin-walled portion 411 to the cover 110, and is formed from a portion of the thin-walled portion 411 and the cover 110.

With this, the full penetration weld portion 430 is formed in a loop around both the projecting portion 420 and the through hole 110a. Moreover, the full penetration weld portion 430 is formed at a location closer to the outer edge of the sealing member 400 than to the center of the sealing member 400.

Next, the method of producing the energy storage device 10 will be described.

Figure 5:
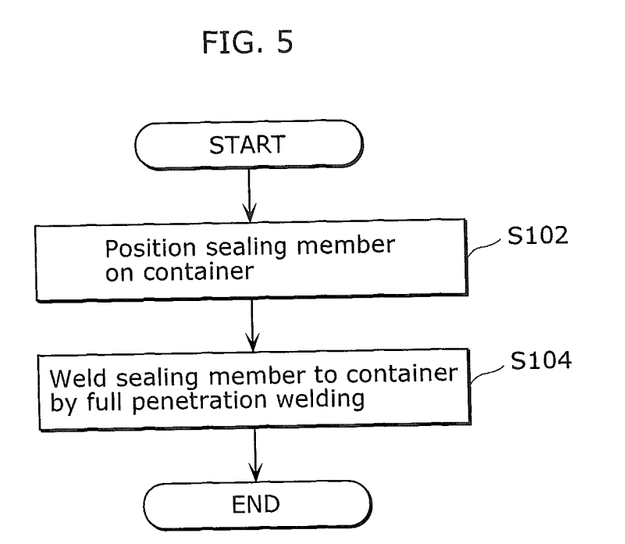
FIG. 5 is a flow chart showing the method of producing the energy storage device according to the embodiment of the present invention.

FIG. 5 is a flow chart showing the method of producing the energy storage device 10 according to the embodiment of the present invention. More specifically, FIG. 5 is a flow chart explaining the process of covering the through hole 110a with the sealing member 400 after the electrolyte has been injected into the container 100 through the through hole 110a.

As FIG. 5 shows, first, as the positioning process, after the electrolyte is injected into the container 100 through the through hole 110a, the sealing member 400 is positioned on the container 100 (S102). In other words, the sealing member 400 is positioned on the cover 110 so as to cover the through hole 110a formed in the cover 110 for injecting the electrolyte.

Next, as the full penetration welding process, the full penetration weld portion 430 is formed by full penetration welding the sealing member 400 to the container 100 (S104). In other words, the fixing portion 410 and the cover 110 are bonded together by full penetration welding the fixing portion 410 to the cover 110 from the side of the sealing member 400 on which the groove portion 411a of the fixing portion 410 is formed. With this, it is possible to seal the through hole 110a with the sealing member 400.

As described above, with the energy storage device 10 according to the embodiment of the present invention, since the sealing member 400 is fixed to the container 100 by being welded to the container 100 by full penetration welding, it is possible for the electrolyte clinging between the sealing member 400 and the container 100 to evaporate as the sealing member 400 melts from the full penetration welding. Moreover, defective welds as a result of the laser directly hitting the electrolyte clinging to the outer edge of the sealing member 400 do no occur. This makes it possible to reduce the occurrence of defective welds resulting from the sealing member 400 being welded to the container 100 while the electrolyte is clinging to the sealing member 400.

Moreover, since the full penetration weld portion 430 is formed in a loop around the through hole 110a whereby the sealing member 400 completely seals the through hole 110a, it is possible to prevent the electrolyte from leaking and moisture, for example, from entering the container 100.

Moreover, since the outer edge of the sealing member 400 can be pressed against the container 100 when full penetration welding the sealing member 400 to the container 100, it is possible to minimize the gap between the sealing member 400 and the container 100 while welding more so than with the conventional method of welding the outer edge of the sealing member to the container. Moreover, when the sealing member 400 is produced with a punching process, burrs at the outer edge of the sealing member 400 can be problematic when welding, but when the sealing member 400 welded to the container 100 by full penetration welding, it is possible to avoid areas where burrs are formed. In this way, compared to the conventional method of welding the outer edge of the sealing member to the container, it is possible to reduce the occurrence of defective welds.

Moreover, since the full penetration weld portion 430 is formed as a result of the thin-walled portion 411 of the sealing member 400 being welded to the container 100 by full penetration welding, it is possible to make other areas of the sealing member 400 that are not welded by full penetration welding thick. This in turn makes it possible to keep the sealing member 400 from deforming when handling the sealing member 400, and reduce the occurrence of defective welds resulting from the deformation of the sealing member 400.

Moreover, since it is possible to form the thin-walled portion 411 by forming a groove portion 411a in the sealing member 400, forming the groove portion 411a with a pressing process allows for a uniformly shaped thin-walled portion 411 to be easily formed. Moreover, since it is acceptable if the thin-walled portion 411 is merely formed at a location corresponding to the loop shaped groove portion 411a in which full penetration welding is performed, it is possible to make the areas of the sealing member 400 in which the groove portion 411a is not formed thick. This in turn makes it possible to further keep the sealing member 400 from deforming when handling the sealing member 400, and further reduce the occurrence of defective welds resulting from the deformation of the sealing member 400.

Moreover, by forming the groove portion 411a in the sealing member 400, it is possible to use the groove portion 411a in the alignment of the sealing member 400 with the welding machine.

Moreover, by fixing the sealing member 400 to the container 100 while the projecting portion 420 is inserted in the through hole 110a, it possible to keep the electrolyte from leaking from the through hole 110a when full penetration welding. This in turn makes it possible to further reduce the occurrence of defective welds resulting from the electrolyte clinging to the sealing member 400.

Moreover, by offsetting the full penetration weld portion 430 closer to the outer edge of the sealing member 400, an area of the sealing member 400 is welded by full penetration welding where not much of the electrolyte is clinging rather than in the vicinity of the through hole 110a where much the electrolyte is clinging, thereby making it possible to further reduce the occurrence of defective welds.

Moreover, with the method of producing the energy storage device 10 according to the embodiment of the present invention, the energy storage device 10 is produced by positioning the sealing member 400 on the container 100 and full penetration welding the sealing member 400 to the container 100. As such, the electrolyte clinging to the sealing member 400 can evaporate as the sealing member 400 melts from the full penetration welding, making it possible to reduce the occurrence of defective welds resulting from the electrolyte clinging to the sealing member 400.

Variation 1

Figure 6:
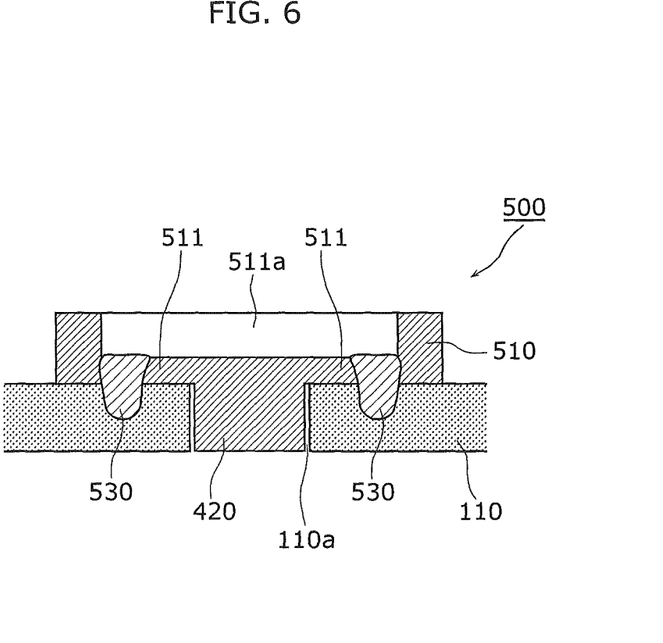
FIG. 6 illustrates the structure of the sealing member of the energy storage device according to Variation 1 of the embodiment of the present invention.

Next, Variation 1 of the above embodiment will be described. FIG. 6 illustrates the structure of a sealing member 500 of the energy storage device according to Variation 1 of the embodiment of the present invention.

As FIG. 6 shows, the sealing member 500 includes a circular (when viewed from above) depression 511a in a fixing portion 510. In other words, in contrast to the above embodiment in which the fixing portion 410 of the sealing member 400 includes a circular loop-shaped (when viewed from above) groove portion 411a, in Variation 1, the fixing portion 510 of the sealing member 500 includes a circular (when viewed from above) depression 511a. The fixing portion 510 includes a thick-walled portion surrounding the thin-walled portion 511.

Moreover, a circular platter shaped thin-walled portion 511 is formed in the fixing portion 510 corresponding to the depression 511a such that the thick-walled portion surrounds a periphery of the thin-walled portion 511. A full penetration weld portion 530 is formed by full penetration welding the thin-walled portion 511 to the cover.

The above-described structure of the sealing member 500 according to Variation 1 of the embodiment of the present invention achieves the same advantageous effects as the above embodiment, and allows for a decrease in the occurrence of defective welds when welding the sealing member 500 to the container 100.

Variation 2

Figure 7:
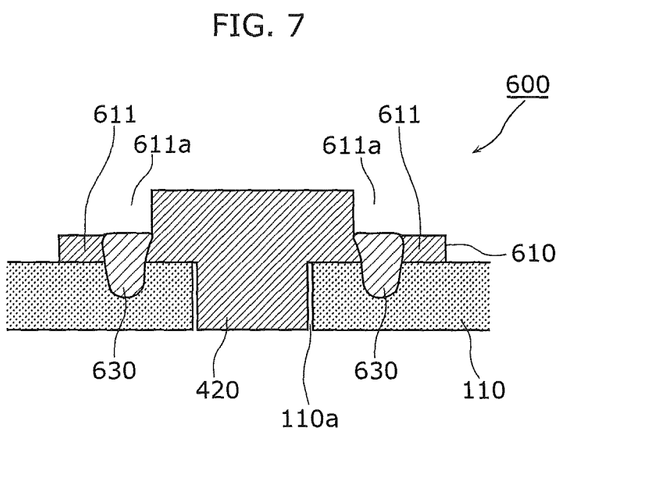
FIG. 7 illustrates the structure of the sealing member of the energy storage device according to Variation 2 of the embodiment of the present invention.

Next, Variation 2 of the above embodiment will be described. FIG. 7 illustrates the structure of a sealing member 600 of the energy storage device according to Variation 2 of the embodiment of the present invention.

As FIG. 7 shows, a sealing member 600 includes a circular (when viewed from above) step portion 611a at the periphery of a fixing portion 610. In other words, in contrast to the above embodiment in which the fixing portion 410 of the sealing member 400 includes the groove portion 411a, in Variation 2, the fixing portion 610 of the sealing member 600 includes, at the periphery thereof, the step portion 611a.

Moreover, a circular thin-walled portion 611 is formed in the fixing portion 610 corresponding to the step portion 611a. A full penetration weld portion 630 is formed by full penetration welding the thin-walled portion 611 to the cover 110. The thin-walled portion 611 surrounds a periphery of a thick-walled portion.

The above-described structure of the sealing member 600 according to Variation 2 of the embodiment of the present invention achieves the same advantageous effects as the above embodiment, and allows for a decrease in the occurrence of defective welds when welding the sealing member 600 to the container 100.

Variation 3

Figure 8:
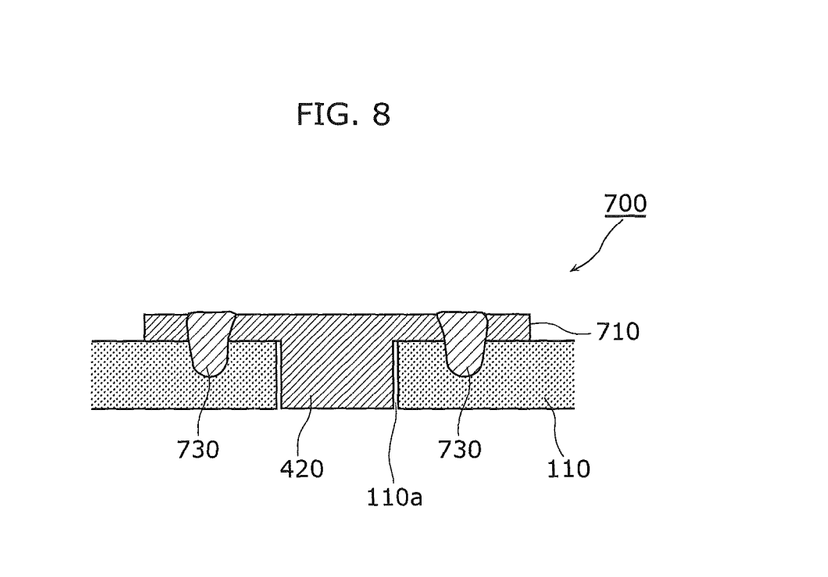
FIG. 8 illustrates the structure of the sealing member of the energy storage device according to Variation 3 of the embodiment of the present invention.

Next, Variation 3 of the above embodiment will be described. FIG. 8 illustrates the structure of a sealing member 700 of the energy storage device according to Variation 3 of the embodiment of the present invention.

As FIG. 7 shows, the sealing member 700 includes a flat fixing portion 710. In other words, in contrast to the above embodiment in which the fixing portion 410 of the sealing member 400 includes the groove portion 411a, in Variation 3, no groove portions, depressions, or step portions are formed in the fixing portion 710 of the sealing member 700.

In other words, the fixing portion 710 performs the same function as the thin-walled portion 411 in the above embodiment. A full penetration weld portion 730 is formed by full penetration welding the fixing portion 710 to the cover 110.

The above-described structure of the sealing member 700 according to Variation 3 of the embodiment of the present invention allows for a decrease in the occurrence of defective welds when welding the sealing member 700 to the container 100.

Variation 4

Figure 9:
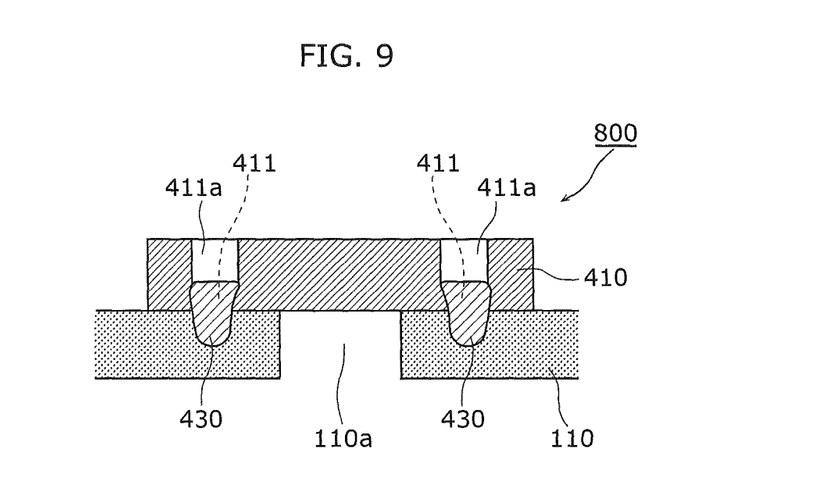
FIG. 9 illustrates the structure of the sealing member of the energy storage device according to Variation 4 of the embodiment of the present invention.

Next, Variation 4 of the above embodiment will be described. FIG. 9 illustrates the structure of a sealing member 800 of the energy storage device according to Variation 4 of the embodiment of the present invention.

As FIG. 9 shows, the sealing member 800 includes the same fixing portion 410 including the first and second thick-walled portions that surround the thin-walled portion 411 as in the above embodiment. In other words, in contrast to the above embodiment in which the fixing portion 410 of the sealing member 400 includes the projecting portion 420, in Variation 4, the sealing member 800 is not provided with a projecting portion.

The above-described structure of the sealing member 800 according to Variation 4 of the embodiment of the present invention achieves the same advantageous effects as the above embodiment, and allows for a decrease in the occurrence of defective welds when welding the sealing member 800 to the container 100.

Variation 5

Next, Variation 5 of the above embodiment will be described. In the above embodiment, the sealing member 400 is positioned on the cover 110. However, in Variation 5, the sealing member is positioned on the case.

Figure 10:
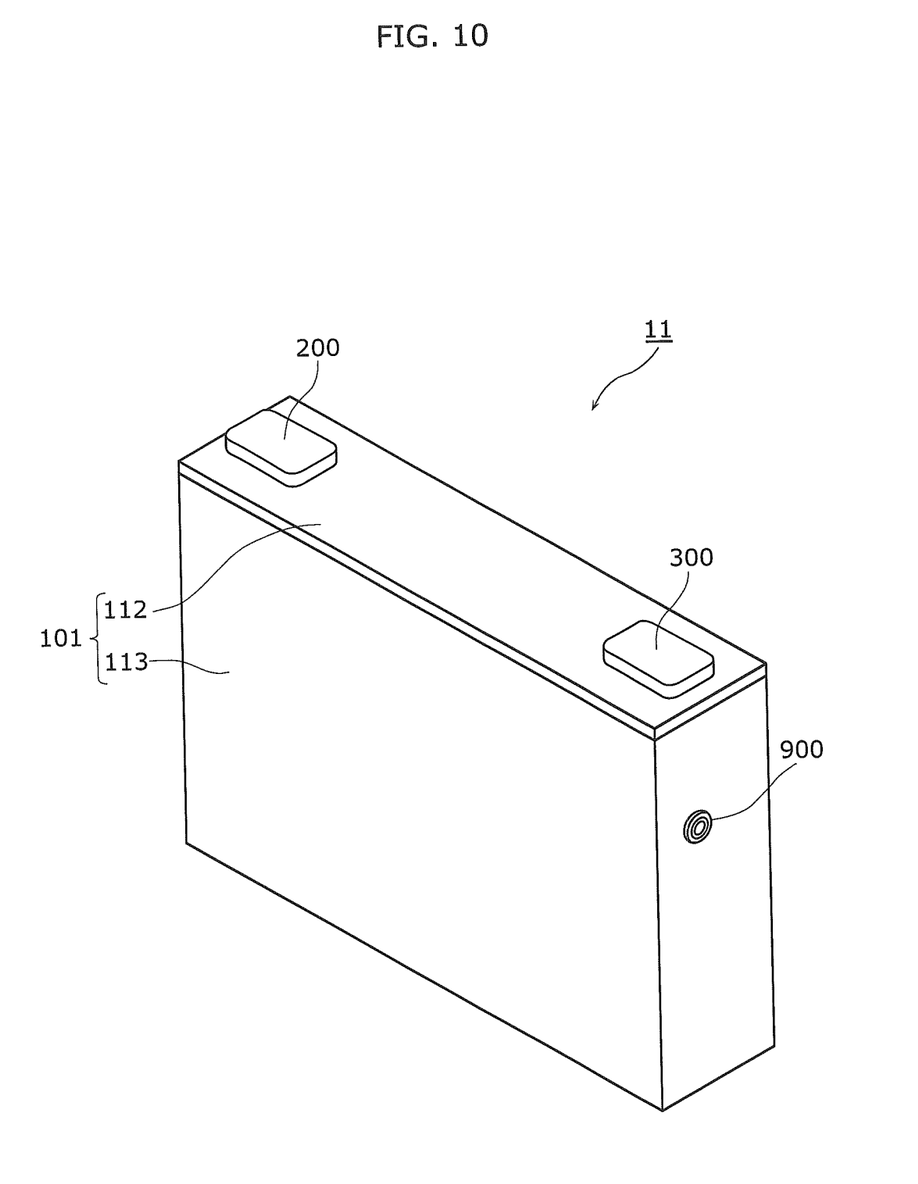
FIG. 10 illustrates the structure of the energy storage device according to Variation 5 of the embodiment of the present invention.

FIG. 10 illustrates the structure of an energy storage device 11 according to Variation 5 of the embodiment of the present invention.

As FIG. 10 shows, a sealing member 900 is positioned on a side wall of a case 113 of a container 101 versus the cover 112 of the container 101. It should be noted that the position of the sealing member 900 is not limited to the position shown in FIG. 10. Moreover, the sealing member 900 may be positioned on the bottom wall of the case 113.

The above-described structure of the energy storage device 11 according to Variation 5 of the embodiment of the present invention achieves the same advantageous effects as the above embodiment, and allows for a decrease in the occurrence of defective welds when welding the sealing member 900 to the container 101.

Hereinbefore, the energy storage device according to the present invention has been described based on the exemplary embodiment and variations thereof, but the scope of the present invention is not intended to be limited thereto.

In other words, all aspects of the embodiment and variations thereof disclosed herein are examples, and are not intended to be limiting. Equivalents of the Claims and various modifications are intended to be included in the exemplary embodiment which do not depart from the principles and spirit of the inventive concept, the scope of which is defined in the appended Claims and not the above-described exemplary embodiment.

Various modifications resulting from arbitrary combinations of the exemplary embodiment and the variations thereof are intended to be included within the scope of the present invention. For example, a modification by combining one or more of the above Variations 1 to 3 with Variation 4 is acceptable, as is a modification by combining one or more of the above Variations 1 to 4 with Variation 5.

The invention claimed is:

1. An energy storage device including a container containing an electrolyte, the energy storage device comprising:
a through hole, formed in the container, for injecting the electrolyte;
a sealing member that covers the through hole; and
a full penetration weld portion formed by full penetration welding the sealing member to the container,
wherein the sealing member includes a fixing portion arranged outside the container, the fixing portion including a thin-walled portion which is thinner than a remaining portion of the fixing portion,
wherein the full penetration weld portion is formed by full penetration welding the thin-walled portion to the container, and
wherein an entirety of the full penetration weld portion is located away from an outer edge of the sealing member, the full penetration weld portion penetrating into the sealing member in a thickness direction of the sealing member.

2. The energy storage device according to claim 1, wherein the full penetration weld portion is formed in a loop around the through hole.

3. The energy storage device according to claim 1, wherein the sealing member includes a groove portion formed in a loop around the through hole, and
wherein the thin-walled portion is formed at a location corresponding to the groove portion.

4. The energy storage device according to claim 1, wherein the sealing member includes a projecting portion which is inserted into the through hole, and
wherein the full penetration weld portion is formed in a loop around the projecting portion.

5. The energy storage device according to claim 1, wherein the full penetration weld portion is formed at a location closer to an outer edge of the sealing member than to a center of the sealing member.

6. A method of producing an energy storage device including a container containing an electrolyte, the method comprising:
positioning a sealing member on the container to cover a through hole formed in the container for injecting the electrolyte; and
forming a full penetration weld portion by full penetration welding the sealing member to the container,
wherein the sealing member includes a fixing portion arranged outside the container, the fixing portion including a thin-walled portion which is thinner than a remaining portion of the fixing portion,
wherein the full penetration weld portion is formed by full penetration welding the thin-walled portion to the container, and
wherein an entirety of the full penetration weld portion is located away from an outer edge of the sealing member, the full penetration weld portion penetrating into the sealing member in a thickness direction of the sealing member.

7. The energy storage device according to claim 1, wherein the full penetration weld portion comprises a portion of the thin-walled portion and the container full penetration welded into the container.

8. The energy storage device according to claim 1, wherein the thin-walled portion comprises a depression in a central part of the sealing member, in a cross-sectional view, the depression extending between opposing walls of the remaining portion of the fixing portion that has a thickness more than a thickness of the thin-walled portion.

9. The energy storage device according to claim 8, wherein the full penetration weld portion is disposed in outer edges of the thin-walled portion and in inner edges of the opposing walls of the remaining portion of the fixing portion.

10. The energy storage device according to claim 1, wherein the thin-walled portion comprises a step portion located in an outer periphery of the sealing member, in a cross-sectional view, the remaining portion of the fixing portion being located in a central part of the sealing member and the step portion extending from outer edges of the remaining portion of the fixing portion to outer edges of the sealing member.

11. The energy storage device according to claim 10, wherein the full penetration weld portion is disposed in inner edges of the thin-walled portion and in the outer edges of the remaining portion of the fixing portion.

12. The energy storage device according to claim 1, wherein the remaining portion of the fixing portion comprises:
a first thick-walled portion surrounding a first periphery of the thin-walled portion; and
a second thick-walled portion surrounding a second periphery of the thin-walled portion,
wherein a thickness of the first thick-walled portion and the second thick-walled portion are more than a thickness of the thin-walled portion.

13. The energy storage device according to claim 12, wherein the full penetration weld portion is disposed in the thin-walled portion between the first thick-walled portion and the second thick-walled portion.

14. The energy storage device according to claim 13, wherein the sealing member further comprises a groove, disposed in the thin-walled portion, and located between the first thick-walled portion and the second thick-walled portion, the full penetration weld portion being disposed in the groove and penetrating below an upper surface of the container.

15. An energy storage device, comprising:
a container;
a through hole formed in the container for injecting an electrolyte;
a sealing member that covers the through hole, the sealing member being located outside the container and comprising a thin-walled portion and a thick-walled portion surrounding a periphery of the thin-walled portion, the thick-walled portion having a thickness more than a thickness of the thin-walled portion; and
a full penetration weld portion that welds the thin-walled portion to the container by a full penetration welding, through the thin-walled portion, into the container,
wherein an entirety of the full penetration weld portion is located away from an outer edge of the sealing member, the full penetration weld portion penetrating into the sealing member in a thickness direction of the sealing member.

16. The energy storage device according to claim 15, wherein the sealing member further comprises another thick-walled portion surrounding another periphery of the thin-walled portion and having a thickness more than the thickness of the thin-walled portion.

17. The energy storage device according to claim 16, wherein the full penetration weld portion is disposed in the thin-walled portion between the thick-walled portion and said another thick-walled portion.

18. The energy storage device according to claim 16, wherein the sealing member further comprises a groove, disposed in the thin-walled portion, and located between the thick-walled portion and said another thick-walled portion, the full penetration weld portion being disposed in the groove and penetrating below an upper surface of the container.

19. The energy storage device according to claim 18, wherein, in a cross-sectional view, a distance between a centerline of the groove to an outer edge of the sealing member is less than a distance between the centerline of the groove and a centerline of the sealing member.

* * * * *